US012272194B2

(12) United States Patent
Suzuki

(10) Patent No.: US 12,272,194 B2
(45) Date of Patent: Apr. 8, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 18/225,261

(22) Filed: Jul. 24, 2023

(65) Prior Publication Data

US 2024/0112512 A1 Apr. 4, 2024

(30) Foreign Application Priority Data

Sep. 29, 2022 (JP) ................................ 2022-156648

(51) Int. Cl.
*G07C 9/00* (2020.01)

(52) U.S. Cl.
CPC .................... *G07C 9/00309* (2013.01); *G07C 2009/00436* (2013.01)

(58) Field of Classification Search
None
See application file for complete search history.

(56) References Cited

U.S. PATENT DOCUMENTS 5,635,916 A * 6/1997 Bucholtz ................. B60R 25/04 340/5.24
8,768,565 B2 * 7/2014 Jefferies ............... G07C 5/0808 701/32.7
10,434,935 B1 * 10/2019 Zhang .............. G08G 1/096725

FOREIGN PATENT DOCUMENTS

JP 2006-118122 A 5/2006

* cited by examiner

*Primary Examiner* — Carlos Garcia
(74) *Attorney, Agent, or Firm* — Oliff PLC

(57) ABSTRACT

In the information processing device according to the present disclosure, when the use start request of the first vehicle is received from the first terminal, the control unit transmits, to the first vehicle, a first command for transmitting the first identification information of the first vehicle by visible light communication. Thereafter, when the first signal including the second identification information and the first identification information, which are the identification information of the first user, is received from the first terminal, the control unit transmits the digital key of the first vehicle to the first terminal on condition that the second identification information included in the first signal matches the third identification information associated with the first identification information in advance.

18 Claims, 6 Drawing Sheets

FIG. 4

RESERVATION MANAGED DATABASE D310

| RESERVATION ID | VEHICLE ID | USER ID | TERM OF USE | |
|---|---|---|---|---|
| R0001 | V001 | U0001 | —/—/—~—/—/— | RECORD |
| R0002 | V002 | U0002 | —/—/—~—/—/— | RECORD |
| ⋮ | ⋮ | ⋮ | ⋮ | |

INFORMATION PROCESSING DEVICE AND INFORMATION PROCESSING METHOD

CROSS-REFERENCE TO RELATED APPLICATION

This application claims priority to Japanese Patent Application No. 2022-156648 filed on Sep. 29, 2022, incorporated herein by reference in its entirety.

BACKGROUND

1. Technical Field

The present disclosure relates to an information processing device and an information processing method.

2. Description of Related Art

A technique is known in which a server device transmits authentication information for unlocking a vehicle to a terminal device via a network, and the terminal device is used as a digital key (see, for example, Japanese Unexamined Patent Application Publication No. 2006-118122 (JP 2006-118122 A)).

SUMMARY

An object of the present disclosure is to provide a technique capable of appropriately providing a user of a sharing car or a rental car with a digital key.

One aspect of the present disclosure is an information processing device. In this case, the information processing device may include, for example, a control unit that executes: receiving a request to initiate use of a first vehicle from a first terminal used by a first user; transmitting, to the first vehicle, a first command for transmitting first identification information by visible light communication, the first identification information being identification information of the first vehicle; receiving a first signal including second identification information and the first identification information from the first terminal, the second identification information being identification information of the first user; and transmitting a digital key of the first vehicle to the first terminal when the second identification information included in the first signal matches third identification information, the third identification information being associated with the first identification information in advance.

Another aspect of the present disclosure is an information processing method. In this case, the information processing method may be, for example, executing processing by a computer, the processing includes: receiving a request to initiate use of a first vehicle from a first terminal used by a first user; transmitting, to the first vehicle, a first command for transmitting first identification information by visible light communication, the first identification information being identification information of the first vehicle; receiving a first signal including second identification information and the first identification information from the first terminal, the second identification information being identification information of the first user; and transmitting a digital key of the first vehicle to the first terminal when the second identification information included in the first signal matches third identification information, the third identification information being associated with the first identification information in advance.

The present disclosure can also be regarded as a program for causing a computer mounted on a vehicle to execute the information processing method described above, or a non-transitory storage medium that stores the program.

According to the present disclosure, it is possible to provide a technique capable of appropriately providing a user of a sharing car or a rental car with a digital key.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating an example of information stored in a reservation management database;

DETAILED DESCRIPTION OF EMBODIMENTS

Figure 1:
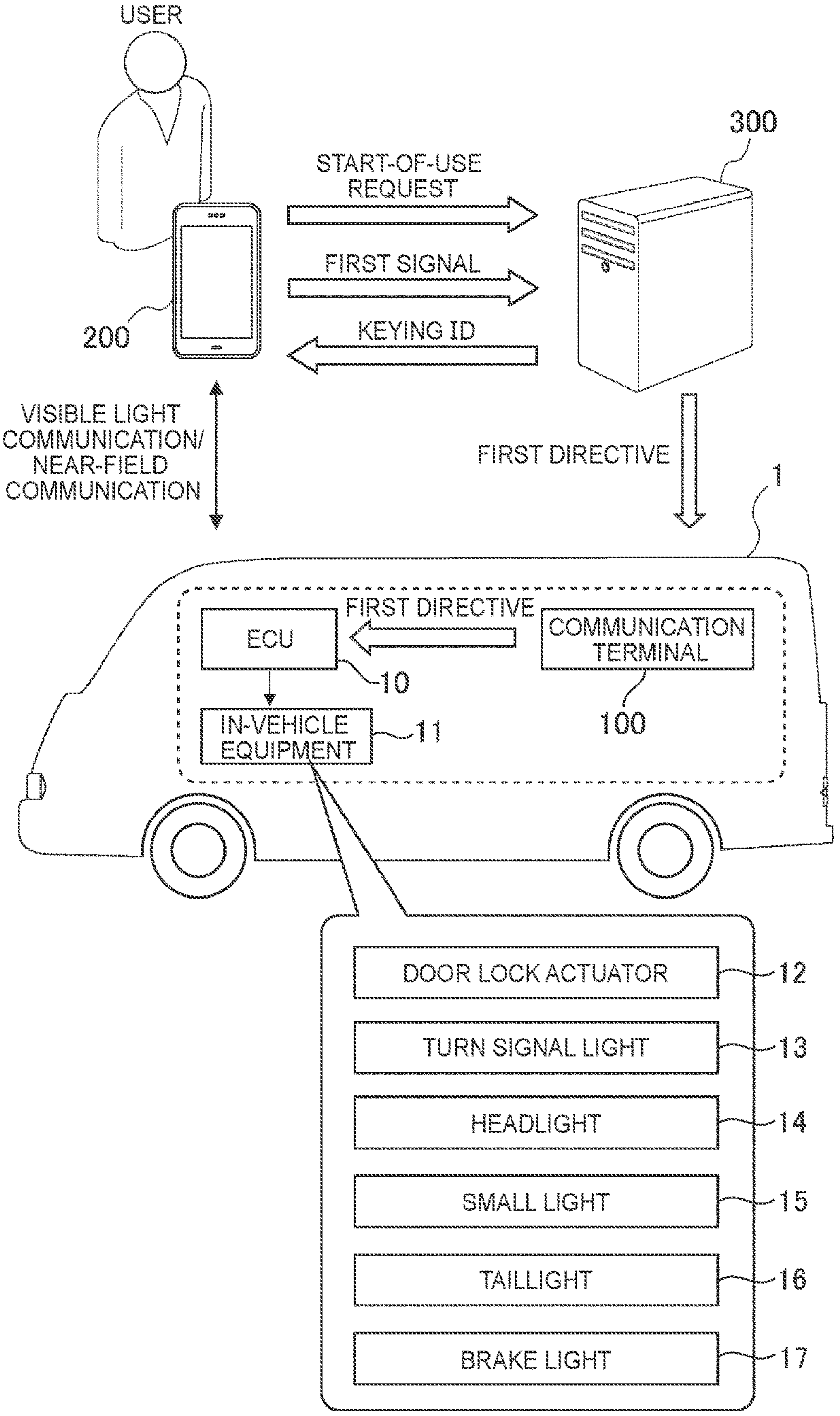
FIG. 1 is a diagram illustrating an outline of an example of a car sharing system.

In a car sharing service, a rent-a-car service, or the like, a server assigns authentication information of a digital key to a user terminal via a network. As a result, a technology in which a user terminal is used as a digital key has become widespread. As a result, it is possible to save time and effort for the service provider and the user to face each other and deliver a physical key such as a smart key. However, there is room for improvement from the viewpoint of appropriately providing authentication information of a digital key to an authorized user of a vehicle.

On the other hand, in the information processing device according to the present disclosure, the control unit receives the use start request of the first vehicle from the first terminal. The "first vehicle" referred to here is, for example, a vehicle that is a target of a car sharing service, a rental car service, or the like. The "first vehicle" is a vehicle in which a reservation for use by the first user is determined. The "use start request" is a signal requesting the digital key of the first vehicle. The "digital key" is information necessary for unlocking the first vehicle using the first terminal. That is, the "digital key" is information required when the first terminal is used as an electronic key of the first vehicle.

The control unit that has received the use start request of the first vehicle transmits, to the first vehicle, a first command for transmitting identification information (first identification information) of the first vehicle by visible light communication. In the first vehicle that has received the first command, the first identification information is transmitted by visible light communication. The transmission of the first identification information by visible light communication is performed, for example, by using lights that emit light toward the outside of the vehicle. The lights may be turn signal lights, headlights, taillights, brake lights, or the like of the first vehicle. At this time, the first user photographs visible light transmitted from the above-described lights through the camera or the like of the first terminal. Thus, the first identification information is received by the user terminal. The user terminal that has received the first identification information transmits a first signal including the first identification information received through the visible light communication and the identification information (second identification information) of the first user to the information processing device.

The first signal transmitted from the first terminal to the information processing device is received by the control unit of the information processing device. At this time, if the second identification information included in the first signal matches the third identification information associated with the first identification information in advance, the control unit transmits the digital key of the first vehicle to the first terminal. Here, the "third identification information" is information for identifying a legitimate user whose use reservation of the first vehicle has been determined.

According to the present disclosure, when a digital key is assigned from an information processing device to a first terminal, it is necessary to perform visible light communication between the first vehicle and the first terminal. In order to perform visible light communication between the first vehicle and the first terminal, the first user needs to use the first terminal at a place where visible light transmitted from the first vehicle can be visually recognized. As a result, if the first user is not in a state in which the real first vehicle has been visually recognized, a digital key is not assigned from the information processing device to the first terminal. When visible light communication is performed between the first vehicle and the first terminal, visible light is transmitted from the first vehicle. Therefore, the first user can find the first vehicle using the visible light as a landmark. Therefore, if the user is in a place where visible light transmitted from the first vehicle can be visually recognized, visible light communication between the first vehicle and the first terminal can be easily established.

Therefore, according to the present disclosure, it is possible to appropriately assign a digital key to a user of a sharing car or a rental car.

Another aspect of the present disclosure can also be specified as an information processing method in which a computer executes the processing of the information processing device. According to such an information processing method, it is possible to obtain the same functions and effects as those of the information processing device. Another aspect of the present disclosure can also be specified as a program for causing a computer to execute the processing of the information processing device, or a non-transitory storage medium storing the program.

Hereinafter, an embodiment of the present disclosure will be described with reference to the drawings. The configurations of the following embodiments are illustrative, and the present disclosure is not limited to the configurations of the embodiments.

EMBODIMENT

An embodiment of the present disclosure will be described with reference to FIG. 1 to FIG. 6. In the present embodiment, an example in which the information processing device according to the present disclosure is applied to a car sharing system will be described. The car sharing system is a system for providing a car sharing service.

General Construction

FIG. 1 is a diagram illustrating an outline of a car sharing system. The car sharing system according to the present embodiment includes a communication terminal 100 mounted on the vehicle 1, a user terminal 200 used by the first user, and a server 300 installed outside the vehicle 1. In the example illustrated in FIG. 1, only one communication terminal 100 (vehicle 1) and one user terminal 200 are illustrated. However, under the management of the server 300, a plurality of communication terminals 100 (the vehicle 1) and a plurality of user terminals 200 may be included.

The vehicle 1 in the present embodiment is a vehicle rented to a user of a car sharing service. The vehicle 1 corresponds to a "first vehicle" according to the present disclosure. The vehicle 1 is equipped with an ECU 10 and an in-vehicle device 11 in addition to the communication terminal 100. ECU 10 is a computer that controls the in-vehicle device 11. The in-vehicle device 11 is a device mounted on the vehicle 1. The in-vehicle device 11 includes a door lock actuator 12, a turn signal light 13, a headlight 14, a small light 15, a taillight 16, a brake light 17, and the like. The turn signal light 13 in the present embodiment is a light using Light Emitting Diode (LED) or a laser diode as a light source. Note that the device included in the in-vehicle device 11 is not limited to the example illustrated in FIG. 1. The devices included in the in-vehicle device 11 may include an air conditioner, a multimedia device, a prime mover, a transmission, an advanced safety system, and the like.

ECU 10 of the present embodiment has a function of performing visible light communication with the user terminal 200 through the turn signal light 13. Note that the apparatus used for visible light communication is not limited to the turn signal light 13. Equipment used for visible light communication may be a headlight 14, a small light 15, a taillight 16, or a brake light 17, as long as it has a light source capable of blinking at a high speed (for example, a speed that cannot be recognized by human vision), such as a LED or a laser diode, and emits light toward the outside of the vehicle.

The communication terminal 100 communicates with the server 300 through a network outside the vehicle (a network N1 to be described later). The communication terminal 100 communicates with ECU 10 through the in-vehicle network. Further, the communication terminal 100 communicates with the user terminal 200 through short-range wireless communication.

The user terminal 200 is a portable computer used by a user of the car sharing service. The user terminal 200 corresponds to a "first terminal" according to the present disclosure. The user terminal 200 according to the present embodiment has a function of communicating with the server 300 through a network N1 to be described later, a function of communicating with the communication terminal 100 of the vehicle 1 through short-range wireless communication, and a function of communicating with the turn signal light 13 of the vehicle 1 through visible light communication.

The server 300 is a computer installed outside the vehicle 1. The server 300 corresponds to an "information processing device" according to the present disclosure. The server 300 is operated by a car sharing service provider or the like. The server 300 in the present embodiment has a function of communicating with the communication terminal 100 and the user terminal 200 through a network N1 described later.

In the car sharing system according to the present embodiment, when the use of the vehicle 1 by the user is started, the user transmits a use start request to the server 300 through the user terminal 200. The use start request is a signal for requesting a key ID of the vehicle 1. The usage initiation request includes a reservation ID. The key ID is required to operate the user terminal 200 as an electronic key of the vehicle 1. The key ID corresponds to a "digital key"

according to the present disclosure. The reservation ID is used to individually identify the use reservation of the vehicles 1. The term "use reservation" as used herein refers to a contract in which the user promises to use the vehicle 1 in a period designated by the user in advance between the user and a provider of a car sharing service or the like. The user terminal transmits a use-start-request signal to the server 300 through a network N1, which will be described later.

When the use start request signal transmitted from the user terminal 200 is received by the server 300, the server 300 identifies the vehicles 1 to be rented to the user based on the reservation ID included in the use start request signal. The server 300 transmits the first command to the communication terminals 100 of the identified vehicles 1 through a network N1 described later. The first command includes a command to transmit the vehicular ID by visible light communication. The vehicle ID is used to identify the vehicle 1 (or the communication terminal 100 mounted on the vehicle 1). The vehicular ID corresponds to the "first identification information" according to the present disclosure.

When the first command transmitted from the server 300 is received by the communication terminal 100 of the vehicle 1, the communication terminal 100 transmits the vehicle ID held by the communication terminal 100 together with the first command to ECU through the in-vehicle network. Upon receiving the first command and the vehicle ID, ECU 10 controls the turn signal light 13 to transmit the vehicle ID by visible light communication. The method of transmitting the vehicular ID by the visible light communication is not limited to a particular method. The method of transmitting vehicular ID by visible light communication may utilize various known methods. As an example, a subcarrier scheme may be used in which the intensity of visible light emitted from the turn signal light 13 is modulated at a vehicular ID while vibrating at a particular frequency.

When the turn signal light 13 of the vehicle 1 is transmitting the vehicle ID by the visible light communication (when the turn signal light 13 is turned on), the user captures the visible light transmitted from the turn signal light 13 through the camera 205, which will be described later, mounted on the user terminal 200. The user terminal 200 demodulates the captured images of the camera 205 into electric signals, and acquires the vehicular ID. The user terminal 200 transmits the first signal including the acquired vehicle ID and the user ID to the server 300 via the network N1. The user ID is used to identify the user. The user ID corresponds to the "second identification information" according to the present disclosure.

When the first signal transmitted from the user terminal 200 is received by the server 300, the server 300 determines, based on the first signal, whether the user is an authorized user of the vehicle 1. The "authorized user" is a user who has made a reservation for use of the vehicle 1. Determination of whether the user is an authorized user of the vehicle is performed based on information stored in a reservation management database D310, which will be described later, included in the server 300. When it is determined that the user is an authorized user of the vehicle 1, the server 300 transmits the key ID of the vehicle 1 to the user terminal 200 through the network N1.

When an operation of requesting unlocking of the vehicle 1 is inputted in the user terminal 200 that has received the key ID, the unlocking request signal is transmitted from the user terminal 200 to the communication terminal 100 through the short-range wireless communication. The unlock request signal transmitted from the user terminal 200 to the communication terminal 100 is transmitted from the communication terminal 100 to ECU 10 via the in-vehicle network. ECU 10 transmits a request for keying ID to the user terminal 200 through the communication terminal 100. In response to this, when a response signal including a key ID is transmitted from the user terminal 200 to the communication terminal 100, a response signal is transmitted from the communication terminal 100 to ECU 10. ECU 10 authenticates the user terminal 200 by collating the key ID included in the response signal with the key ID for collation held by ECU 10. When the user terminal 200 is successfully authenticated, ECU 10 controls the door lock actuator 12 to unlock the vehicle 1. This allows the user to start using the vehicle 1.

Hardware Configuration of the Car Sharing System

Figure 2:
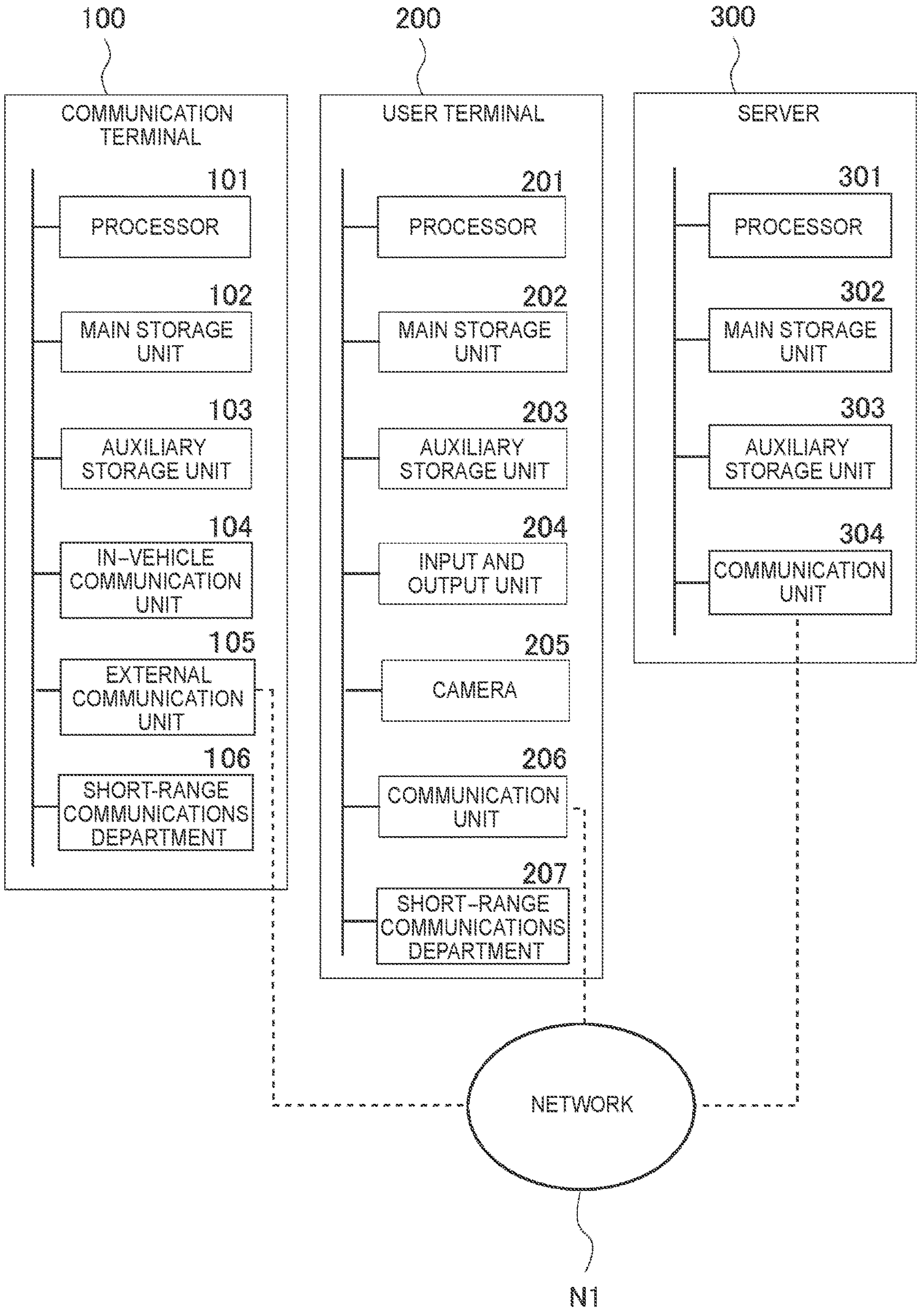
FIG. 2 is a diagram illustrating an example of a hardware configuration of each of a communication terminal, a user terminal, and a server included in a car sharing system.

Here, a hardware configuration example of each of the communication terminal 100, the user terminal 200, and the server 300 included in the car sharing system will be described. FIG. 2 is a diagram illustrating an example of a hardware configuration of each of the communication terminal 100, the user terminal 200, and the server 300 included in the car sharing system.

The communication terminal 100 is a computer mounted on the vehicle 1. As illustrated in FIG. 2, the communication terminal 100 in the present embodiment includes a processor 101, a main storage unit 102, an auxiliary storage unit 103, an in-vehicle communication unit 104, an out-of-vehicle communication unit 105, a short-range communication unit 106, and the like. In FIG. 2, only hardware components that perform processing related to the car sharing service among the hardware components of the communication terminal 100 are extracted and shown. Hardware components other than the hardware components illustrated in FIG. 2 (for example, a hardware component for providing a multimedia service to an occupant of the vehicle 1, a hardware component for performing processing related to an emergency notification, and the like) may be included in the communication terminal 100.

The processor 101 is, for example, Central Processing Unit (CPU) or Digital Signal Processor (DSP). The processor 101 controls the communication terminal 100 by performing various arithmetic processing.

The main storage unit 102 is configured to include, for example, Random Access Memory (RAM) and Read Only Memory (ROM). The main storage unit 102 provides a storage area and a work area for loading a program stored in the auxiliary storage unit 103. The main storage unit 102 is used as a buffer for arithmetic processing by the processor 101.

The auxiliary storage unit 103 is, for example, Erasable Programmable ROM (EPROM) or Hard Disk Drive (HDD). The auxiliary storage unit 103 may also include a removable medium, that is, a portable storage medium. The removable medium is, for example, a disc recording medium such as Universal Serial Bus (USB) memory, Compact Disc (CD), or Digital Versatile Disc (DVD). The auxiliary storage unit 103 stores various programs, data used by the processor 101 when executing the programs, and the like.

The program stored in the auxiliary storage unit 103 includes, in addition to Operating System (OS), an application program for causing the processor 101 to execute a process related to the car sharing service. The data stored in the auxiliary storage unit 103 includes the vehicle ID of the vehicle 1.

Part or all of the information stored in the auxiliary storage unit 103 may be stored in the main storage unit 102. Further, part of the information stored in the main storage unit 102 may be stored in the auxiliary storage unit 103.

The in-vehicle communication unit 104 is an interface for connecting the communication terminal 100 to the in-vehicle network. The in-vehicle network is, for example, a network based on a standard such as Controller Area Network (CAN), Local Interconnect Network (LIN), or FlexRay. In the present embodiment, the in-vehicle communication unit 104 communicates with ECU 10 through the in-vehicle network.

The out-of-vehicle communication unit 105 is an interface for connecting the communication terminal 100 to a network N1 outside the vehicle. The network N1 may be, for example, a Wide Area Network (WAN that is a global public communication network such as the Internet, or another communication network. The out-of-vehicle communication unit 105 is connected to the networked N1 by a mobile communication system such as Long Term Evolution (LTE), LTE-Advanced, 5th Generation (5G), and 6th Generation (6G, or a radio communication system such as Wi-Fi (registered trademark). In the present embodiment, the out-of-vehicle communication unit 105 communicates with the server 300 through a networked N1.

The short-range communication unit 106 transmits and receives data to and from the user terminal 200 using wireless communication of Bluetooth (registered trademark) Low Energy (BLE standard or wireless communication such as Near Field Communication (NFC.

In the communication terminal 100 configured as described above, when the first command transmitted from the server 300 is received by the out-of-vehicle communication unit 105, the processor 101 transmits the vehicle ID stored in the auxiliary storage unit 103 and the first command received from the server 300 to ECU 10 through the in-vehicle communication unit 104. In this situation, in ECU 10, the vehicular ID is transmitted by visible light communication through the control of the turn signal light 13.

In the communication terminal 100 configured as described above, when the unlocking request signal transmitted from the user terminal 200 is received by the short-range communication unit 106, the processor 101 transmits the unlocking request signal to ECU 10 through the in-vehicle communication unit 104. When the request signal transmitted from ECU 10 in response to this is received by the in-vehicle communication unit 104, the processor 101 transmits the request signal to the user terminal 200 through the short-range communication unit 106. When the response signal transmitted from the user terminal 200 in response to the request signal is received by the short-range communication unit 106, the processor 101 transmits the response signal to ECU 10 through the in-vehicle communication unit 104. In ECU 10, the user terminal 200 is authenticated based on the key ID included in the response signal and the key ID for verification. When the user terminal 200 is successfully authenticated, ECU 10 controls the door lock actuator 12 to unlock the vehicles 1.

Note that a series of processes executed by the communication terminal 100 can also be executed by hardware. Further, a series of processes executed by the communication terminal 100 can be executed by software. Further, the hardware configuration of the communication terminal 100 is not limited to the example illustrated in FIG. 2, and components may be omitted, replaced, or added as appropriate.

Next, the user terminal 200 is a portable computer used by a user of the car sharing service. The user terminal 200 is, for example, a smartphone, a mobile phone, a tablet terminal, or a wearable computer (smart watch or the like). As illustrated in FIG. 2, the user terminal 200 in the present embodiment includes a processor 201, a main storage unit 202, an auxiliary storage unit 203, an input/output unit 204, a camera 205, a communication unit 206, a short-range communication unit 207, and the like. In FIG. 2, only hardware components that perform processing related to the car sharing service among the hardware components of the user terminal 200 are extracted and shown. Hardware components other than the hardware components illustrated in FIG. 2 (e.g., a hardware component for obtaining a current position of the user terminal 200, a hardware component for outputting voice, and the like) may be included in the user terminal 200.

The processor 201, the main storage unit 202, the auxiliary storage unit 203, the communication unit 206, and the short-range communication unit 207 of the user terminal 200 are the same as the processor 101, the main storage unit 102, the auxiliary storage unit 103, the out-of-vehicle communication unit 105, and the short-range communication unit 106 of the communication terminal 100, respectively. Therefore, descriptions thereof will be omitted. However, the program stored in the auxiliary storage unit 203 of the user terminal 200 includes, in addition to OS, an application program for causing the processor 101 to execute a process related to the car sharing service. Further, the data stored in the auxiliary storage unit 203 of the user terminal 200 includes a user ID of the user, a reservation ID of the car sharing service, a key ID provided from the server 300, and the like.

The input/output unit 204 receives an input operation performed by the user, and presents information to the user. The input/output unit 204 includes, for example, a touch panel display and a control circuit thereof.

The camera 205 is a device that captures an image of the periphery of the user terminal 200. The camera 205 performs imaging using an image sensor such as, for example, a Charge Coupled Device (CCD) image sensor or a Complementary Metal Oxide Semiconductor (CMOS) image sensor. In the present embodiment, the camera 205 is used as a receiver for visible light communication.

In the user terminal 200 configured as described above, when the use start request is inputted through the input/output unit 204, the processor 201 transmits the use start request including the reservation ID to the server 300 through the communication unit 206.

Further, when the turn signal light 13 of the vehicle 1 is transmitting the vehicle ID by visible light communication, the user photographs the visible light emitted from the turn signal light 13 through the camera 205 of the user terminal 200. Accordingly, the processor 201 demodulates the captured images of the camera 205 into electric signals, and acquires the vehicle ID of the vehicle 1. The method of demodulating the captured image of the camera 205 into an electrical signal is not limited to a specific method, and various known methods can be used. For example, by operating the camera 205 in a line scanning manner, a method of acquiring an image of a stripe pattern reflecting the luminance of each line and converting the stripe pattern of the acquired image into a digital signal may be used.

When the vehicle ID transmitted from the vehicle 1 through the visible light communication is acquired by the user terminal 200, the processor 101 transmits the first signal including the vehicle ID and the user ID to the server 300 through the communication unit 206. When the key ID transmitted from the server 300 in response to the first signal is received by the communication unit 206, the processor 101 stores the key ID in the auxiliary storage unit 203.

Further, when an operation of requesting unlocking of the vehicle 1 is inputted to the input/output unit 204 after the user terminal 200 receives the key ID transmitted from the server 300, the processor 201 transmits the unlocking request signal of the vehicle 1 to the communication terminal 100 of the vehicle 1 through the short-range communication unit 207. After that, when the request signal transmitted from the communication terminal 100 is received by the short-range communication unit 207, the processor 101 returns a response signal including the key ID to the communication terminal 100 of the vehicle 1 through the short-range communication unit 207. When the user terminal 200 is successfully authenticated based on the key ID in the vehicle 1, the vehicle 1 is unlocked. Thus, the user can start using the vehicle 1.

The series of processing executed by the user terminal 200 may be executed by hardware or software. Further, the hardware configuration of the user terminal 200 is not limited to the example illustrated in FIG. 4, and components may be omitted, replaced, or added as appropriate.

Next, the server 300 is a computer operated by a car sharing service provider or the like. As illustrated in FIG. 2, the server 300 includes a processor 301, a main storage unit 302, an auxiliary storage unit 303, a communication unit 304, and the like. In FIG. 2, only hardware components that perform processing related to the car sharing service among the hardware components of the server 300 are extracted and shown, and hardware components other than the hardware components illustrated in FIG. 2 (for example, hardware components for providing services other than the car sharing service, and the like) may be included in the server 300.

The processor 301, the main storage unit 302, and the auxiliary storage unit 303 of the server 300 are the same as the processor 201, the main storage unit 202, and the auxiliary storage unit 203 of the user terminal 200, respectively. Therefore, descriptions thereof will be omitted. However, the program stored in the auxiliary storage unit 303 of the server 300 includes, in addition to OS, a function of accepting a use start request from the user, a function of transmitting the first command to the communication terminal 100 of the vehicle 1, a function of determining whether the user who has made the use start request is an authorized user of the vehicle 1, a function of providing a key ID to the user terminal 200 when the user who has made the use start request is an authorized user of the vehicle 1, and the like, and a program for realizing the server 300. The data stored in the auxiliary storage unit 303 of the server 300 includes data that associates the vehicle 1 with an authorized user.

The communication unit 304 of the server 300 connects the server 300 to a networked N1. The communication unit 304 connects the server 300 to the user terminal 200 via the networked N1. Such a communication unit 304 is configured to include, for example, a Local Area Network (LAN) interface board, a wireless communication circuit for wireless communication, or the like.

The series of processing executed by the server 300 may be executed by hardware or software. Further, the hardware configuration of the server 300 is not limited to the example illustrated in FIG. 2, and components may be omitted, replaced, or added as appropriate.

Functional Configuration of the Server 300

Figure 3:
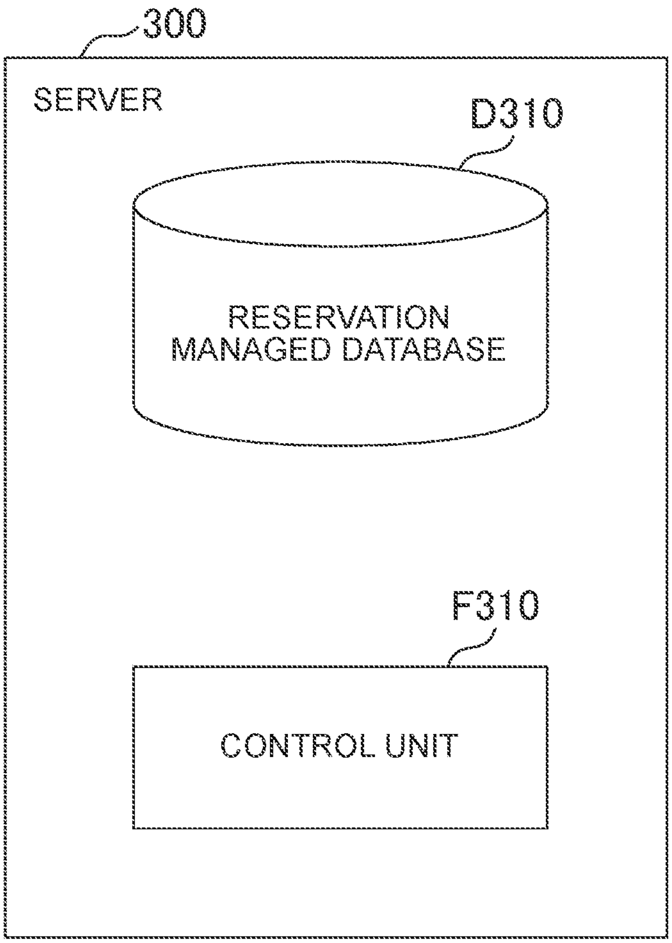
FIG. 3 is a block diagram illustrating an example of a functional configuration of a server.

Here, a functional configuration of the server 300 according to the present embodiment will be described. FIG. 3 is a block diagram illustrating an example of a functional configuration of the server 300 according to the present embodiment. As illustrated in FIG. 3, the server 300 according to the present embodiment includes a reservation management database D310 and a control unit F310 as functional components thereof. Note that the functional components of the server 300 are not limited to the example illustrated in FIG. 3, and components may be omitted, replaced, or added as appropriate.

The reservation management database D310 is constructed by Database Management System (DBMS) managing the data stored in the auxiliary storage unit 303. The database management system is a program executed by the processor 301 of the server 300. The reservation management database D310 is, for example, a relational database.

The reservation management database D310 stores data for associating the vehicle 1 with an authorized user of the vehicle 1. FIG. 4 is a diagram illustrating an example of information stored in the reservation management database D310. As illustrated in FIG. 4, the reservation management database D310 according to the present embodiment includes records for each use reservation (hereinafter, may be referred to as "reservation information records"). As shown in FIG. 4, each reservation data record includes fields such as a reservation ID, an ID of vehicles, a user ID, and a usage period. Note that the configuration of the reservation information record is not limited to the example illustrated in FIG. 4, and fields can be added, changed, or deleted as appropriate.

In the reservation ID field, information (reservation ID) for identifying the respective use reservations is registered. In the vehicle ID field, the vehicle ID of the vehicle 1 that is the target of the use reservation is registered. In the user ID field, the user ID of the user who is the lending destination of the vehicles 1 to which the respective use reservations are to be made is registered. In the usage period field, a usage period (a period during which the vehicle 1 is lent to the user) of the vehicle 1 that is a target of each usage reservation is registered. The reservation data record having such a configuration is generated and registered in the reservation management database D310 when the reservation for use of the vehicle 1 by the user is confirmed. In addition, the reservation information record registered in the reservation management database D310 is deleted from the reservation management database D310 at a timing at which the use period ends or at a timing at which the return of the vehicle 1 by the user is completed.

Referring back to FIG. 3, the control unit F310 is achieved by the processor 301 loading a program stored in the auxiliary storage unit 303 into the main storage unit 302 and executing the program. Note that a part of the control unit F310 or the control unit F310 may be realized by a hardware-circuit such as Application Specific Integrated Circuit (ASIC) or Field Programmable Gate Array (FPGA).

The control unit F310 specifies the vehicles 1 to be lent to the user of the user terminal 200 when the use-start-request signal transmitted from the user terminal 200 is received by the communication unit 304 of the server 300. Specifically, the control unit F310 specifies the reservation information record in which the information matching the reservation ID is registered in the reservation ID field by accessing the reservation management database D310 using the reservation ID included in the use start request signal as an argument. The control unit F310 specifies the vehicle 1 to be lent to the user of the user terminal 200 based on the information (vehicle ID) registered in the vehicle ID field of the specified reservation information record. The control unit F310 transmits the first command to the communication terminal 100 of the specified vehicle 1 through the communication unit 304. As described above, the first command includes a command for transmitting the vehicular ID by visible light communication.

Note that the transmission of the first command may be performed only when the reception date and time of the use start request signal is within the use period of the user. That is, the first command may be transmitted only when the reception date and time of the use start request signal is within the use period registered in the use period field of the reservation information record. Thus, it is possible to suppress the first command from being transmitted to the vehicle 1, for example, when another user is using the vehicle 1.

After the first command is transmitted, when the communication unit 304 of the server 300 receives the first signal transmitted from the user terminal 200, the control unit F310 transmits the second command to the communication terminal 100 of the vehicle 1 through the communication unit 304. The second command includes a command for terminating the transmission of the vehicular ID by the visible light communication. The control unit F310 authenticates the user based on the vehicle ID and the user ID included in the first signal. Specifically, the control unit F310 accesses the reservation management database D310 using ID of vehicles included in the first signal as an argument. Then, the control unit F310 specifies the reservation information record in which the information matching the vehicle ID is registered in the vehicle ID field and in which the use period registered in the use period field has arrived. The control unit F310 compares the information registered in the user ID field of the specified reservation information record (corresponding to the "third identification information" according to the present disclosure) with the user ID included in the first signal. When the information registered in the user ID field of the reserved information record matches the user ID included in the first signal, the control unit F310 determines that the user of the user terminal 200 is the authorized user of the vehicle 1. In addition, when the information registered in the user ID field of the reserved information record does not coincide with the user ID included in the first signal, the control unit F310 determines that the user of the user terminal 200 is not an authorized user of the vehicle 1.

When it is determined that the user of the user terminal 200 is an authorized user of the vehicle 1, the control unit F310 transmits the key ID of the vehicle 1 to the user terminal 200 through the communication unit 304. On the other hand, when it is determined that the user of the user terminal 200 is not an authorized user of the vehicle 1, the control unit F310 does not transmit the key ID of the vehicle 1 to the user terminal 200. Thus, unless visible light communication is established between the user terminal 200 of the authorized user and the vehicle 1, the key ID is not given to the user terminal 200.

If the communication unit 304 does not receive the first signal within the first time length (for example, from several tens of seconds to several minutes) from the time point when the first command is transmitted, the control unit F310 regards the use starting request from the user terminal 200 as invalid and transmits the second command to the communication terminal 100 of the vehicle 1. As a result, it is possible to suppress an unnecessary increase in the power consumption of the turn signal light 13.

Processing Flow

Figure 5:
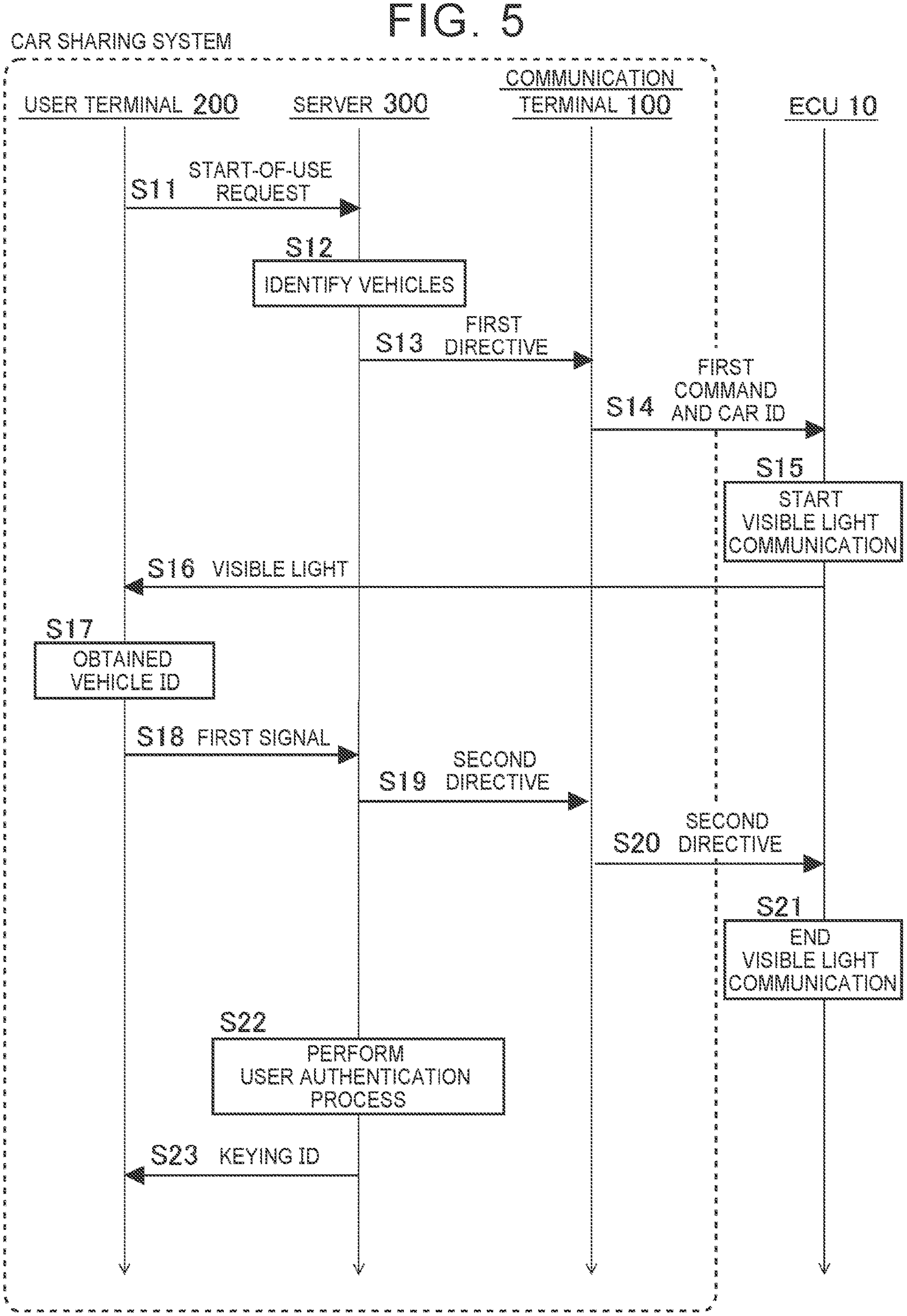
FIG. 5 is a diagram illustrating an exemplary sequence of processes executed by a communication terminal, a user terminal, and a server of the car sharing system.
Figure 6:
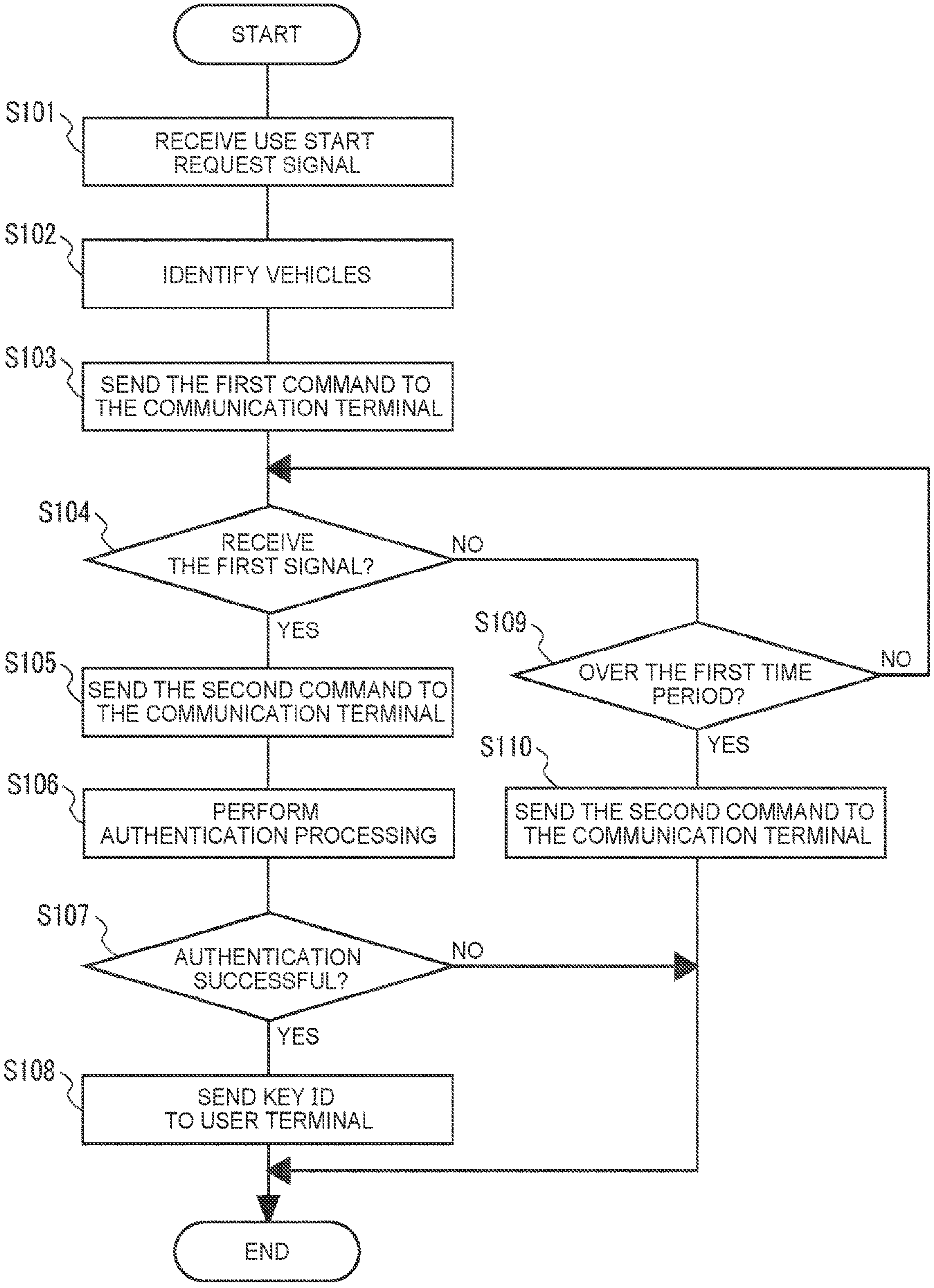
FIG. 6 is a flowchart illustrating an example of a processing routine executed by a server.

Next, a flow of processing related to the car sharing service in the present embodiment will be described with reference to FIG. 5 and FIG. 6. FIG. 5 is a diagram illustrating an exemplary sequence of processes executed by the respective components of the car sharing system and ECU 10 of the vehicle 1 when the user inputs a use start request through the input/output unit 204 of the user terminal 200. FIG. 6 is a flowchart illustrating an example of a processing routine executed by the server 300 triggered by reception of a use start request signal transmitted from the user terminal 200.

In FIG. 5, when the user inputs a use start request through the input/output unit 204 of the user terminal 200, the processor 201 of the user terminal 200 transmits a use start request signal to the server 300 through the communication unit 206 (S11).

When the use start request signal transmitted from the user terminal 200 is received by the communication unit 304 of the server 300, the processor 301 of the server 300 identifies the vehicle 1 to be lent to the user of the user terminal 200 based on the reservation ID included in the use start request signal (S12).

The processor 101 of the server 300 transmits a first command to the communication terminal 100 of the vehicle 1 identified by S12 through the communication unit 304 (S13).

When the first command transmitted from the server 300 is received by the out-of-vehicle communication unit 105 of the communication terminal 100, the processor 101 of the communication terminal 100 reads the vehicle ID stored in the auxiliary storage unit 103. The processor 101 transmits the vehicular ID and the first command to ECU 10 through the in-vehicle communication unit 104 (S14).

When the vehicle ID and the first command transmitted from the communication terminal 100 are received by ECU 10, ECU 10 starts transmitting the vehicle ID by visible light communication through the turn signal light 13 (S15, S16). At this time, ECU 10 controls the turn signal light 13 so as to modulate, for example, the intensity of visible light emitted from the turn signal light 13 by the vehicular ID while vibrating at a particular frequency.

When the user captures the visible light through the camera 205 of the user terminal 200 while the visible light modulated by the vehicle ID is being transmitted from the turn signal light 13, the processor 201 of the user terminal 200 demodulates the captured image of the camera 205 into an electric signal to obtain the vehicle ID of the vehicle 1 (S17). At this time, the processor 201 of the user terminal 200 controls the camera 205 to operate in a line scan manner. As a result, the processor 201 acquires an image of the striped pattern in which the luminance of each line is measured. The processor 201 converts the striped pattern of the acquired images into a digital-signal to obtain the vehicular ID.

When the vehicular ID is acquired by the user terminal 200, the processor 201 of the user terminal 200 reads the user ID stored in the auxiliary storage unit 203. The processor 201 transmits a first signal including the vehicle ID acquired by S17 and the user ID read from the auxiliary storage unit 103 to the server 300 through the communication unit 206 (S18).

When the first signal transmitted from the user terminal 200 is received by the communication unit 304 of the server 300, the processor 301 of the server 300 transmits the second command to the communication terminal 100 of the vehicle 1 through the communication unit 304 (S19).

When the second command transmitted from the server 300 is received by the out-of-vehicle communication unit 105 of the communication terminal 100, the processor 101 of the communication terminal 100 transmits the second command to ECU 10 through the in-vehicle communication unit 104 (S20).

When the second command transmitted from the communication terminal 100 is received by ECU 10, ECU 10 terminates transmitting the vehicular ID by visible light communication (S21). That is, ECU 10 turns off the turn signal light 13.

Further, in the server 300 that has finished executing the processing of S19, the processor 301 executes the authentication processing of the user on the basis of the first signal and the information of the reservation management database D310 (S22). That is, the processor 301 determines whether the user of the user terminal 200 is an authorized user of the vehicle 1.

When the user is successfully authenticated in S22, the processor 301 of the server 300 transmits the key ID of the vehicle 1 to the user terminal 200 through the communication unit 304 (S23). As a result, the user terminal 200 can operate as an electronic key of the vehicle 1 by using the key ID provided from the server 300.

Next, details of processing executed by the server 300 in the sequence of processing illustrated in FIG. 5 will be described with reference to FIG. 6. The execution subject of the processing illustrated in FIG. 6 is the processor 301 of the server 300, and here, the functional components of the server 300 are described as the execution subject.

In FIG. 6, when the use start request signal transmitted from the user terminal 200 is received by the communication unit 304 of the server 300 (S101), the control unit F310 of the server 300 identifies the vehicle 1 to be lent to the user of the user terminal 200 based on the reservation ID included in the use start request signal (S102). Specifically, the control unit F310 accesses the reservation management database D310 using the reservation ID as an argument. Then, the control unit F310 specifies the reservation information record in which the information matching the reservation ID is registered in the reservation ID field. The control unit F310 specifies the corresponding vehicle 1 based on the information (vehicle ID) registered in the vehicle ID field of the specified reservation information record. When the control unit F310 finishes executing S102 process, it executes S103 process.

In S103, the control unit F310 transmits a first command to the communication terminal 100 of the vehicle 1 specified by S102 through the communication unit 304. The first command includes a command for transmitting the vehicular ID by visible light communication, as described above. When the control unit F310 finishes executing S103 process, it executes S104 process.

In S104, the control unit F310 determines whether the first signal that should be transmitted from the user terminal 200 is received by the communication unit 304. When the communication unit 304 has received the first signal transmitted from the user terminal 200 (affirmative determination in S104), the control unit F310 executes S105 process.

In S105, the control unit F310 transmits the second command to the communication terminal 100 of the vehicle 1 through the communication unit 304. As described above, the second command includes a command for terminating the transmission of the vehicular ID by the visible light communication. When the control unit F310 finishes executing S105 process, it executes S106 process.

In S106, the control unit F310 performs a process of authenticating the user on the basis of the first signal received from the user terminal 200. Specifically, the control unit F310 accesses the reservation management database D310 using ID of vehicles included in the first signal as an argument. Then, the control unit F310 specifies the reservation information record in which the information matching the vehicle ID is registered in the vehicle ID field and in which the use period registered in the use period field has arrived. The control unit F310 compares the user ID included in the first signal with the user ID registered in the user ID field of the specified reservation information record. When the control unit F310 finishes executing S106 process, it executes S107 process.

In S107, the control unit F310 determines whether the authentication executed in S106 is successful. Here, if the user ID included in the first signal matches the user ID registered in the user ID field of the appointment information record, the control unit F310 determines that the authentication is successful (affirmative determination in S107). On the other hand, if the user ID included in the first signal does not coincide with the user ID registered in the user ID field of the reservation information record, the control unit F310 determines that the authentication has failed (negative determination in S107).

If an affirmative determination is made in S107, the control unit F310 proceeds to S108 process. The control unit F310 transmits the key ID of the vehicle 1 to the user terminal 200 through the communication unit 304. As a result, the user terminal 200 can operate as an electronic key of the vehicle 1 by using the key ID. As a result, the user can start using the vehicle 1 by unlocking the vehicle 1 using the user terminal 200.

If a negative determination is made in S107, the control unit F310 ends the execution of this processing routine without executing S108 processing. If a negative determination is made in S107, the control unit F310 may transmit, to the user terminal 200 through the communication unit 304, information indicating that the visible light selected as the subject of the camera 205 is transmitted from another vehicle (a vehicle different from the vehicle 1 to be lent to the user).

In the above-described S104, when the first signal that should be transmitted from the user terminal 200 has not been received by the communication unit 304 (negative determination in S104), the control unit F310 executes S109 process. In S109, the control unit F310 determines whether or not the first time length or more has elapsed since the first command was transmitted. When the first time length or more has not elapsed since the first command is transmitted (negative determination in S109), the control unit F310 executes S104 process again. On the other hand, when the first time length or more has elapsed since the first command was transmitted (affirmative determination in S109), it is estimated that the transmission of the use-start-request signal from the user terminal 200 is caused by the user's erroneous operation, or that the user is located in a location where the visible-light transmitted from the turn signal light 13 of the vehicle 1 cannot be visually recognized, or the like. Therefore, when an affirmative determination is made in S109, the control unit F310 proceeds to S110 process. Then, the control unit F310 transmits the second command to the communication terminal 100 of the vehicle 1 through the communication unit 304. As a result, it is possible to suppress an unnecessary increase in the power consumption of the turn signal light 13.

According to the above-described embodiment, when the user starts using the vehicle 1, in order to give a key ID from the server 300 to the user terminal 200, the visible-light transmitted from the turn signal light 13 of the vehicle 1 needs to be captured by the camera 205 of the user terminal

200. Further, in order to capture visible light transmitted from the turn signal light 13 of the vehicle 1 by the camera 205 of the user terminal 200, it is necessary for an authorized user to be in a place where visible light transmitted from the turn signal light 13 of the vehicle 1 can be visually recognized. Therefore, the key ID of the vehicle 1 can be given to the user terminal 200 provided that the authorized user has already visually recognized the real vehicle 1.

In addition, visible light transmitted from the turn signal light 13 of the vehicle 1 is visible to the user. Therefore, the user can also find the vehicle 1 using the visible light as a landmark. Thus, even in a situation where a plurality of other vehicles is parked around the vehicle 1, the user can find the vehicle 1. Therefore, if the user is in a place where the visible light transmitted from the turn signal light 13 of the vehicle 1 can be visually recognized, it becomes easy to capture the visible light transmitted from the turn signal light 13 of the vehicle 1 by the camera 205 of the user terminal 200.

Therefore, according to the present embodiment, the key ID can be appropriately given to the user of the sharing car.

Other

The above-described embodiment is merely an example, and the present disclosure can be appropriately modified and implemented without departing from the gist thereof. For example, although an example in which the information processing device according to the present disclosure is applied to a car sharing system has been described in the above-described embodiment, the information processing device may be applied to a system that provides a rental car service.

Also, the processes and the configurations described in the present disclosure can be appropriately combined to be implemented as long as no technical contradiction occurs. Moreover, the processes described as being executed by one device may be shared and executed by a plurality of devices. Alternatively, the processes described as being executed by different devices may be executed by one device. In the computer system, it is possible to flexibly change the hardware configuration for implementing each function.

Further, the present disclosure can also be realized by supplying a computer program implementing the functions described in the above embodiments to a computer, and one or more processors included in the computer read and execute the program. Such a computer program may be provided to the computer by a non-transitory computer-readable storage medium connectable to the system bus of the computer, or may be provided to the computer via a network. The non-transitory computer-readable storage medium is a recording medium that can store information such as data and programs by electrical, magnetic, optical, mechanical, or chemical action and can be read from a computer or the like. Such a non-transitory computer-readable storage medium is, for example, a disc of any type such as a magnetic disc (floppy (registered trademark) disc, hard disk drive (HDD), and the like) and an optical disc (compact disc read-only memory (CD-ROM), digital versatile disc (DVD), Blu-ray disc, and the like). Also, the non-transitory computer-readable storage medium may be a medium such as a read-only memory (ROM), a random access memory (RAM), a EPROM, EEPROM, a magnetic card, a flash memory, an optical card, or a Solid State Drive (SSD).

What is claimed is:

1. An information processing device comprising a control unit that executes:

receiving a request to initiate use of a first vehicle from a first terminal used by a first user;

transmitting, to the first vehicle, a first command for transmitting first identification information by visible light communication, the first identification information being identification information of the first vehicle;

receiving a first signal including second identification information and the first identification information from the first terminal, the second identification information being identification information of the first user; and transmitting a digital key of the first vehicle to the first terminal when the second identification information included in the first signal matches third identification information, the third identification information being associated with the first identification information in advance.

2. The information processing device according to claim 1, further comprising a database that stores the first identification information and the third identification information in association with each other, wherein when the control unit receives the first signal, the control unit executes:

determining whether the second identification information matches the third identification information based on the first signal and information stored in the database;

transmitting the digital key to the first terminal when the second identification information is determined to match the third identification information; and not transmitting the digital key to the first terminal when the second identification information is determined not to match the third identification information.

3. The information processing device according to claim 2, wherein:

the first command is a command for continuously transmitting the first identification information by visible light communication; and when the control unit does not receive the first signal within a first time length after transmitting the first command, the control unit transmits, to the first vehicle, a second command for stopping transmission of the first identification information by visible light communication.

4. The information processing device according to claim 2, wherein the first command is a command for causing a turn signal light of the first vehicle to transmit the first identification information by visible light communication.

5. The information processing device according to claim 2, wherein the first command is a command for causing a headlight of the first vehicle to transmit the first identification information by visible light communication.

6. The information processing device according to claim 2, wherein the first command is a command for causing a taillight of the first vehicle to transmit the first identification information by visible light communication.

7. The information processing device according to claim 2, wherein the first command is a command for causing a brake light of the first vehicle to transmit the first identification information by visible light communication.

8. The information processing device according to claim 1, wherein:

the first vehicle is a vehicle used for a car sharing service; and the third identification information is identification information of a user who has made a reservation for use of the first vehicle.

9. The information processing device according to claim 1, wherein:

the first vehicle is a vehicle used in a rental car service; and the third identification information is identification information of a user who has made a reservation for use of the first vehicle.

10. An information processing method comprising executing processing by a computer, the processing including:

receiving a request to initiate use of a first vehicle from a first terminal used by a first user;

transmitting, to the first vehicle, a first command for transmitting first identification information by visible light communication, the first identification information being identification information of the first vehicle;

receiving a first signal including second identification information and the first identification information from the first terminal, the second identification information being identification information of the first user; and transmitting a digital key of the first vehicle to the first terminal when the second identification information included in the first signal matches third identification information, the third identification information being associated with the first identification information in advance.

11. The information processing method according to claim 10, wherein:

the computer includes a database that stores the first identification information and the third identification information in association with each other;

when the computer receives the first signal, the method includes:

determining whether the second identification information matches the third identification information based on the first signal and information stored in the database;

transmitting the digital key to the first terminal when the second identification information is determined to match the third identification information; and not transmitting the digital key to the first terminal when the second identification information is determined not to match the third identification information.

12. The information processing method according to claim 11, wherein:

the first command is a command for continuously transmitting the first identification information by visible light communication; and when the computer does not receive the first signal within a first time length after transmitting the first command, the computer transmits, to the first vehicle, a second command for stopping transmission of the first identification information by visible light communication.

13. The information processing method according to claim 11, wherein the first command is a command for causing a turn signal light of the first vehicle to transmit the first identification information by visible light communication.

14. The information processing method according to claim 11, wherein the first command is a command for causing a headlight of the first vehicle to transmit the first identification information by visible light communication.

15. The information processing method according to claim 11, wherein the first command is a command for causing a taillight of the first vehicle to transmit the first identification information by visible light communication.

16. The information processing method according to claim 11, wherein the first command is a command for causing a brake light of the first vehicle to transmit the first identification information by visible light communication.

17. The information processing method according to claim 10, wherein:

the first vehicle is a vehicle used for a car sharing service; and the third identification information is identification information of a user who has made a reservation for use of the first vehicle.

18. The information processing method according to claim 10, wherein:

the first vehicle is a vehicle used in a rental car service; and the third identification information is identification information of a user who has made a reservation for use of the first vehicle.

* * * * *